(12) United States Patent
Horowitz et al.

(10) Patent No.: US 6,662,157 B1
(45) Date of Patent: Dec. 9, 2003

(54) SPEECH RECOGNITION SYSTEM FOR DATABASE ACCESS THROUGH THE USE OF DATA DOMAIN OVERLOADING OF GRAMMARS

(75) Inventors: Brenda Horowitz, Plantation, FL (US); James R. Lewis, Delray Beach, FL (US); David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 09/596,770

(22) Filed: Jun. 19, 2000

(51) Int. Cl.[7] .............................................. G10L 15/26
(52) U.S. Cl. ...................................................... 704/235
(58) Field of Search ............................. 704/270.1, 231, 704/246, 275, 235

(56) References Cited

U.S. PATENT DOCUMENTS

| | | | | |
|---|---|---|---|---|
| 4,994,966 A | * | 2/1991 | Hutchins ........................ | 704/9 |
| 5,802,526 A | * | 9/1998 | Fawcett et al. ............. | 348/14.06 |
| 6,085,206 A | * | 7/2000 | Domini et al. ............... | 707/533 |
| 6,088,428 A | * | 7/2000 | Trandal et al. ............... | 379/189 |
| 6,101,473 A | * | 8/2000 | Scott et al. .................. | 704/275 |
| 6,269,336 B1 | * | 7/2001 | Ladd et al. ............... | 379/88.13 |
| 6,298,324 B1 | * | 10/2001 | Zuberec et al. ............. | 704/251 |
| 6,311,182 B1 | * | 10/2001 | Colbath et al. ............. | 379/900 |

* cited by examiner

Primary Examiner—Doris H. To
Assistant Examiner—Michael N. Opsasnick
(74) Attorney, Agent, or Firm—Akerman Senterfitt

(57) ABSTRACT

A method for voice data entry availability in a voice response system can include receiving speech input specifying data in an audio user interface to a data information system for processing data in a data store. The speech input can be received through an audio user interface to the data information system. Subsequently, speech-to-text conversion of the speech input can be performed using a speech recognition engine with reference to a corresponding speech grammar. In particular, the speech grammar can contain a data set of words relating to the data information system. Notably, the data store can contain a subset of the data set, the subset having words which can be processed by the data information system, the subset not having words which cannot be processed by the data information system. If the specified data is included in the speech grammar and if the specified data is in the data store, the speech data in the speech query can be processed. However, if the specified data is not in the data store, it can be reported that the specified data cannot be processed. Finally, if the specified data is not included in the speech grammar, an Out-Of-Grammar (OOG) condition can be reported. Additionally, the speech data in the speech query is not processed.

12 Claims, 3 Drawing Sheets

SPEECH RECOGNITION SYSTEM FOR DATABASE ACCESS THROUGH THE USE OF DATA DOMAIN OVERLOADING OF GRAMMARS

BACKGROUND OF THE INVENTION

1. Technical Field

This invention relates to the field of voice response systems and more particularly to a method and system for voice data entry recognition in a voice response system.

2. Description of the Related Art

In data information systems in which forms are employed with which a user can supply data to the system, often a field, or series of fields can be completed by the user. In such data information systems, users can supply data for each field in the form. However, data fields can be restricted with regard to the data which can be supplied therein. For instance, in a data information system for collecting user contact information, a form can restrict data supplied in the city and state fields to those cities or states which are available (have associated data) in the data information system. As an example, while Miami, Fla. might be an available city and state pair in the system, the data information system might not have any information about the city and state pair Sunny Ga. making Sunny Ga. unavailable in the system.

In visually interactive data information systems employing visual interfaces, data to be supplied in a field in a form can be restricted through the use of a corresponding list box. In a list box, users can be presented with a predefined list of data entries acceptable for input in a corresponding field. Still, the use of a list box in an audibly interactive data information system employing an audio user interface can prove tedious at best. First, in an audio user interface, for each list box corresponding to a field in a form, the audio user interface must audibly playback the acceptable data entries in the list box until the user selects one of the acceptable data entries. As an alternative, the user can memorize each available data entry in the list box prior to audibly supplying an available data entry.

Second, unlike the case of a visual user interface, in an audio user interface, the problem of data entry availability can be compounded with the problem of speech recognition. In particular, in the case of a visual user interface, the user can select an available data entry with a mouse-click or by typing the acceptable data entry. In either case, the user-supplied data entry is unmistakable. In contrast, in the case of an audio user interface, in addition to surmounting the data availability process, the user-supplied data must surmount recognition problems associated with the speech recognition process. More specifically, anything that is to be audibly supplied to a field in a form through an audio user interface not only must be considered an available entry from the perspective of the data information system, but also must be considered a speech recognizable entry from the perspective of the speech recognition engine.

For example, in a voice response system, each word supplied as a voice response must exist in a speech recognition grammar in order to successfully undergo a speech-to-text conversion process. If a user utters a word not contained in the speech recognition grammar, an Out of Grammar (hereinafter "OOG") condition can arise. Typically, a voice response system can respond to an OOG condition by "throwing" an OOG exception. When an OOG exception is thrown, a voice response system can only inform the user that the voice response provided to the voice response system was not understood (because it was not located in the speech recognition grammar).

The circumstance in which a user interacts with a voice response system for providing information regarding particular cities is an example of this problem. When prompted by the voice response system to provide the name of a city for which the voice response system can provide information, a user can utter, "Sunny" as in Sunny Ga. Preferably, if the voice response system does not contain information Sunny Ga. the user should be notified, "There is no information on Sunny, Ga.". However, if Georgia is not included in the speech recognition grammar, when the user utters Sunny Ga., the voice response system will throw an OOG exception and the data information system will respond with, "I did not understand what you said." Consequently, the voice response system cannot indicate to the user that Sunny Ga. is not an available city/state pair in the data store of the voice response system because the voice response system never successfully speech recognized the user voice input "Sunny Ga." in the first place. Thus, there exists a need for a voice response system in which words not contained in the data stores of the voice response system are nonetheless recognized by the voice response system so that the voice response system can report the same to the user.

SUMMARY OF THE INVENTION

The present invention is a voice response system in which words not contained in the data stores of the voice response system are nonetheless recognized by the voice response system so that the voice response system can report "No information on . . ." rather than reporting an OOG exception. The present invention solves the problem of the OOG condition by overloading the speech recognition grammar with word data entries which may or may not exist in the voice response system data stores. In consequence, voice responses which a user might speak are at least recognizable and "actionable" by the voice response system, even though the voice response may not be an available response in the data store. In the above-described example, a user can provide the voice response, "Sunny Ga." and receive in return from the voice response system, "There is no information on Sunny Ga." In contrast, a user can provide the voice response, "Iskabibble" which correctly can cause an OOG condition. In response, the user can receive from the voice response system, "I did not understand what you said". Hence, the present invention alleviates the OOG condition which would otherwise create a bad usability problem.

A method for voice data entry availability in a voice response system can include establishing a data set of words relating to a data information system; including the data set of words in a speech grammar for use with a speech recognition engine; and including a subset of the data set in a data store, wherein the subset has words used by the data information system, and the subset does not have words in the data set which are not used by the data information system. Subsequently, speech queries can be received which specify data. The speech queries can be received through an audio user interface to the data information system. Speech-to-text conversion can be performed on the speech queries using the speech recognition engine.

If the specified data is in the data set and if the specified data also is in the subset, the speech queries can be processed with the specified data. However, if the specified data is in the data set, but the specified data is not in the subset, the specified data is reported not to be in the subset. Finally, if the specified data is not in the data set, it is reported that the specified data cannot be speech-to-text converted. Furthermore, the speech query is not processed.

In the preferred embodiment, the step of reporting that the specified data cannot be speech-to-text converted can include throwing an Out-Of-Grammar (OOG) exception. Additionally, the step of receiving speech queries through an audio user interface to the data information system can include receiving speech queries in the voice response system telephonically. Specifically, the speech queries can originate through a telephone handset. Subsequently, the speech queries can be transmitted no through a telephone data network and received in the voice response system through a telephone data network interface in the voice response system. Finally, the speech queries can be communicated from the telephone data network interface to the audio user interface.

Alternatively, the speech queries can originate in a kiosk, through a personal digital assistant, a personal computer, or any other suitable platform for providing audio input to a computer speech recognition system. Notably, the audio user interface can be a Voice Browser to a Web-enabled data information system, wherein the Voice Browser enables voice operation of the Web-enabled data information system.

A method for voice data entry availability in a voice response system can also include receiving speech input specifying data in an audio user interface to a data information system for processing data in a data store. The speech input can be received through an audio user interface to the data information system. Subsequently, speech-to-text conversion of the speech input can be performed using a speech recognition engine with reference to a corresponding speech grammar. In particular, the speech grammar can contain a data set of words relating to the data information system. Notably, the data store can contain a subset of the data set, the subset having words which can be processed by the data information system, the subset not having words which cannot be processed by the data information system.

If the specified data is included in the speech grammar and if the specified data is in the data store, the speech data in the speech query can be processed. However, if the specified data is not in the data store, it can be reported that the specified data cannot be processed. Finally, if the specified data is not included in the speech grammar, an Out-Of-Grammar (OOG) condition can be reported. Additionally, the speech data in the speech query is not processed.

In the preferred embodiment, the step of reporting an OOG condition can include throwing an OOG exception. Additionally, the step of receiving speech input in an audio user interface to the data information system can include receiving speech input in the voice response system telephonically. Specifically, the speech input can originate through a telephone handset. Subsequently, the speech input can be transmitted through a telephone data network and the speech input can be received in the voice response system through a telephone data network interface in the voice response system. Finally, the speech input can be communicated from the telephone data network interface to the audio user interface. Notably, the audio user interface can be a Voice Browser to a Web-enabled data information system, the Voice Browser enabling voice operation of the Web-enabled data information system.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1A:
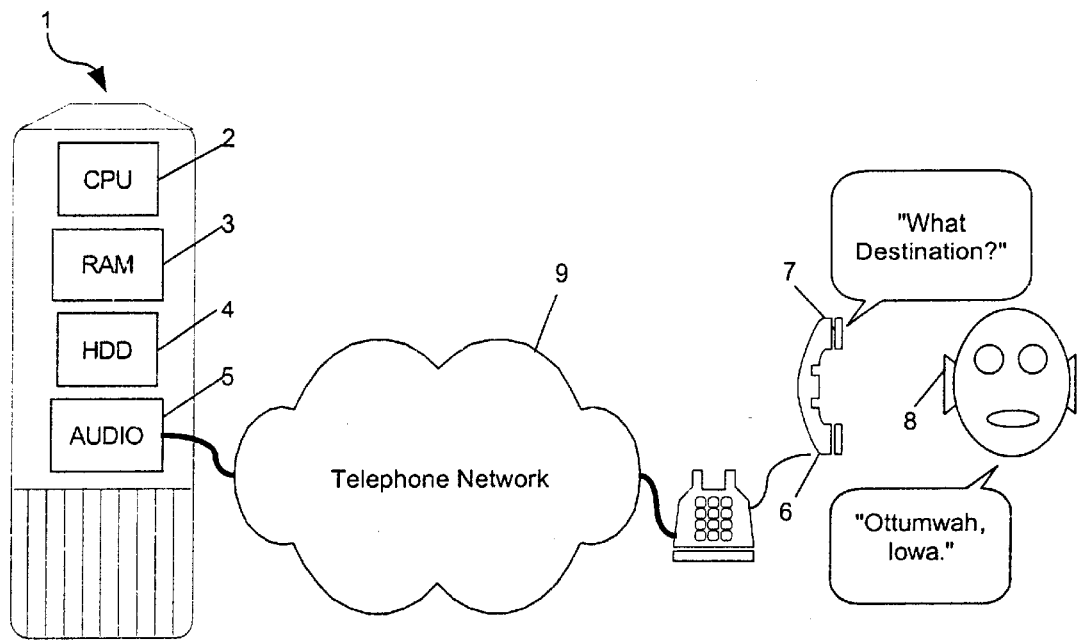
FIGS. 1A and 1B, taken together, are a pictorial representation of a voice response system suitable for use in the present invention.
Figure 1B:
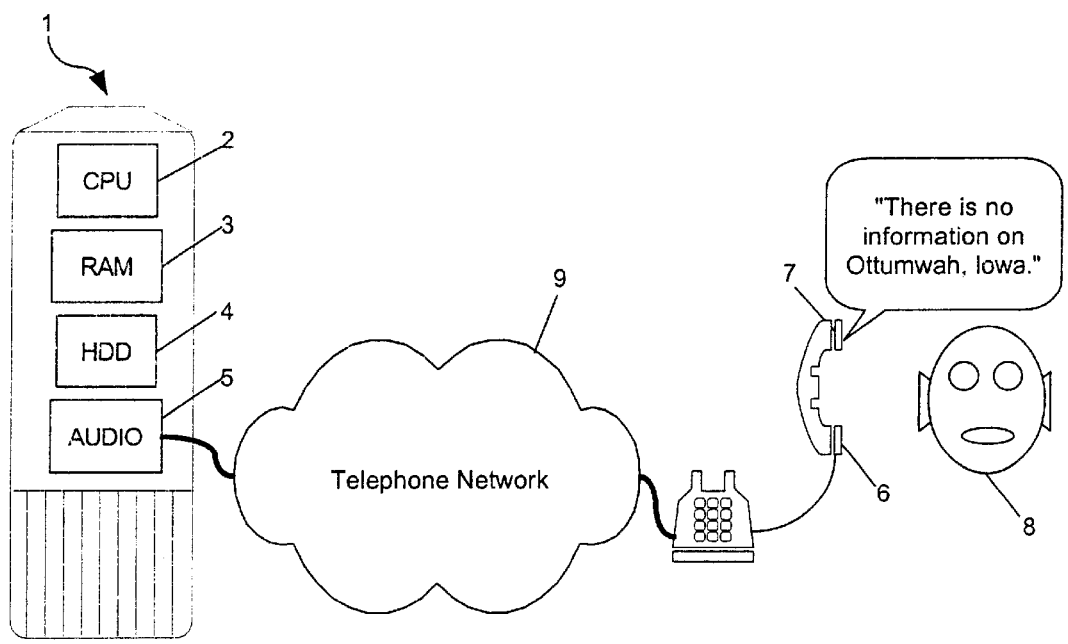

The present invention is a method and system for voice data entry availability in a voice response system. FIGS. 1A and 1B, taken together, illustrate a voice response system suitable for use with the method of the invention. Specifically, a voice response system for use in the present invention can include a computer system 1 containing a data information system which is voice enabled through the use of a speech recognition engine. A user 8 of the voice response system can communicate with the voice response system through an audio capable link 9, for example a public switched telephone network (PSTN) or a cellular telephone link. Preferably, the user 8 can both supply audio input and receive audio output through transducer means, for example a telephone connected to the computer system 1.

In the example shown in FIGS. 1A and 1B, the user 8 can connect to the computer system 1 which contains a voice enabled data information system, such as for providing travel information on destination cities. Upon connecting to the voice as enabled data information system through a telephone connected to the audio capable link 9, the data information system audibly prompts the user 8 to provide a destination city. The user 8 responds, "Sunny Ga." Notably, for exemplary purposes only, the city "Sunny Ga." is not included in the data stores of the data information system. Hence, the data information system cannot provide information on "Sunny Ga.". Notwithstanding, a speech grammar included with the speech recognition system at least includes speech data for Sunny so that an OOG condition is avoided and the data information system can notify the user 8 that "There is no information on Sunny Ga."

As shown in FIGS. 1A and 1B, the computer system 1 preferably comprises therein a central processing unit (CPU) 2, and internal memory devices, such as random access memory (RAM) 3, and fixed storage 4 for example a hard disk drive (HDD). Optionally, the computer system 1 can further include a keyboard and a user interface display unit such as a video display terminal (VDT) operatively connected thereto for the purpose of a user locally interacting with the computer system 1. However, the invention is not limited in this regard. Rather, the computer system 1 requires neither a keyboard nor a VDT to operate according to the inventive arrangements.

Computer audio circuitry 5 is also preferred and can be included in the computer system 1 so as to provide an audio processing capability to the computer system 1. As such, audio input means 6, for example a microphone, and audio output means 7, for example a speaker, can be provided both to receive audio input signals for processing in the computer audio circuitry 5 and to provide audio output signals processed by the computer audio circuitry 5. In the preferred embodiment, a telephone handset includes both the audio input means 6 and the audio output means 7. Notably, the telephone handset can be operatively connected to the computer audio circuitry 5 through the audio capable link 9.

The user 8 can provide audio input and receive audio output to and from the computer system 1 of the present invention through the handset connected to the audio capable link 9. The computer system 1 can be connected to the audio capable link 9 through a computer communications network having a telephony interface. Notwithstanding, the invention is not so limited in regard to the manner in which the computer system 1 is connected to the user 8 through the audio capable link 9. Moreover, the user 8 need not communicate with the computer system 1 through the audio capable link 9. Rather, the user 8 can conventionally provide audio input to the computer system 1 through a microphone directly connected to the computer audio circuitry 5. Likewise, the user 8 can conventionally receive audio output from the computer system 1 through speakers directly connected to the computer audio circuitry 5.

Figure 2:
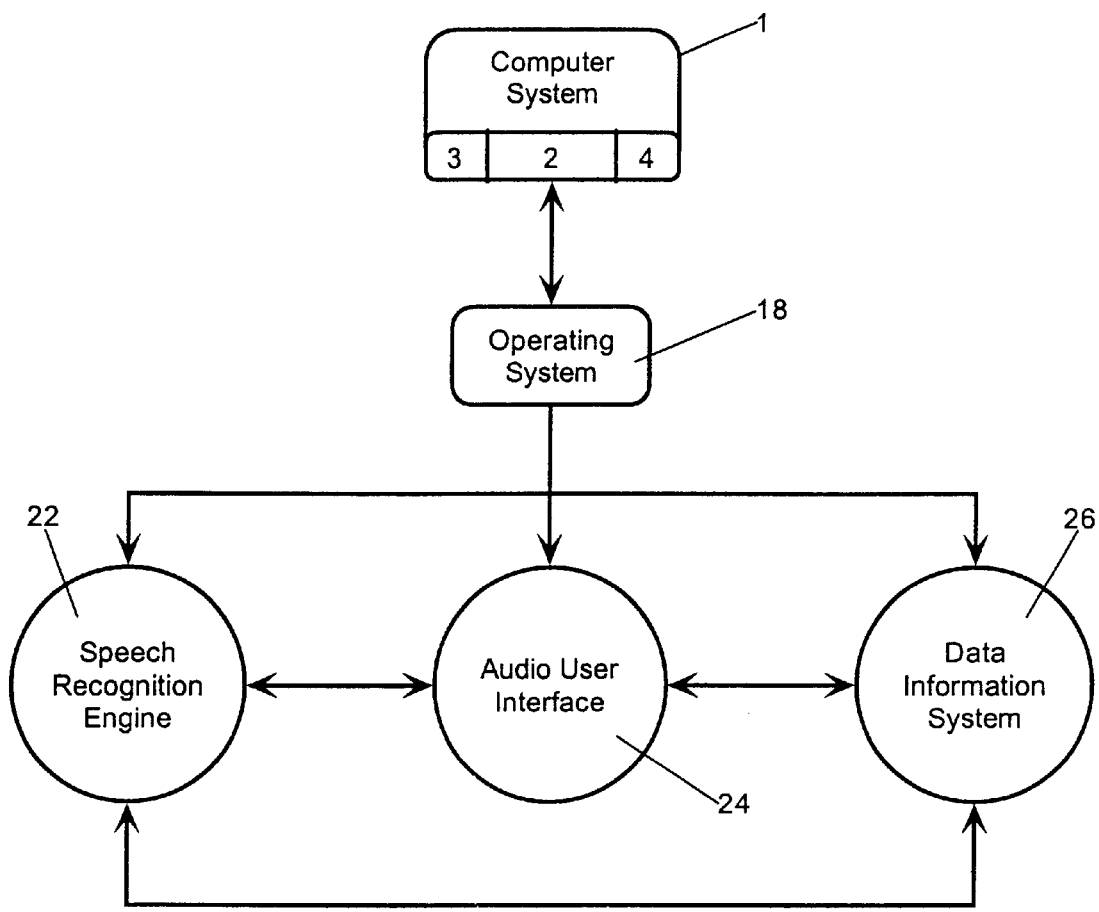
FIG. 2 is a schematic diagram of an architecture for use with the voice response system of FIG. 1.

FIG. 2 illustrates a preferred architecture for the computer system 1 of the voice response system of FIGS. 1A and 1B. The computer system 1 can store in fixed storage 4 an operating system 18 upon which various applications programs can execute. The operating system 18 can include any suitable operating system, for example Microsoft Windows NT®, Sun Solaris® or Linux. Upon the bootstrap of the computer system 1, the operating system 18 can load into memory 3. Subsequently, a voice enabled data information system 26 can load and execute in memory 3. The voice enabled data information system 26 can be any data information system which has been voice enabled by virtue of an associated audio user interface 24. In the preferred embodiment, the audio user interface 24 operates conventionally in coordination with an underlying speech recognition engine 22 for converting audio input into recognized text ultimately which can be provided to the data information system 26 as input. An example of an audio user interface 24 configured for use with a data information system is IBM WebSphere® Voice Server with ViaVoice® Technology manufactured by IBM Corporation of Armonk, NY.

Figure 3:
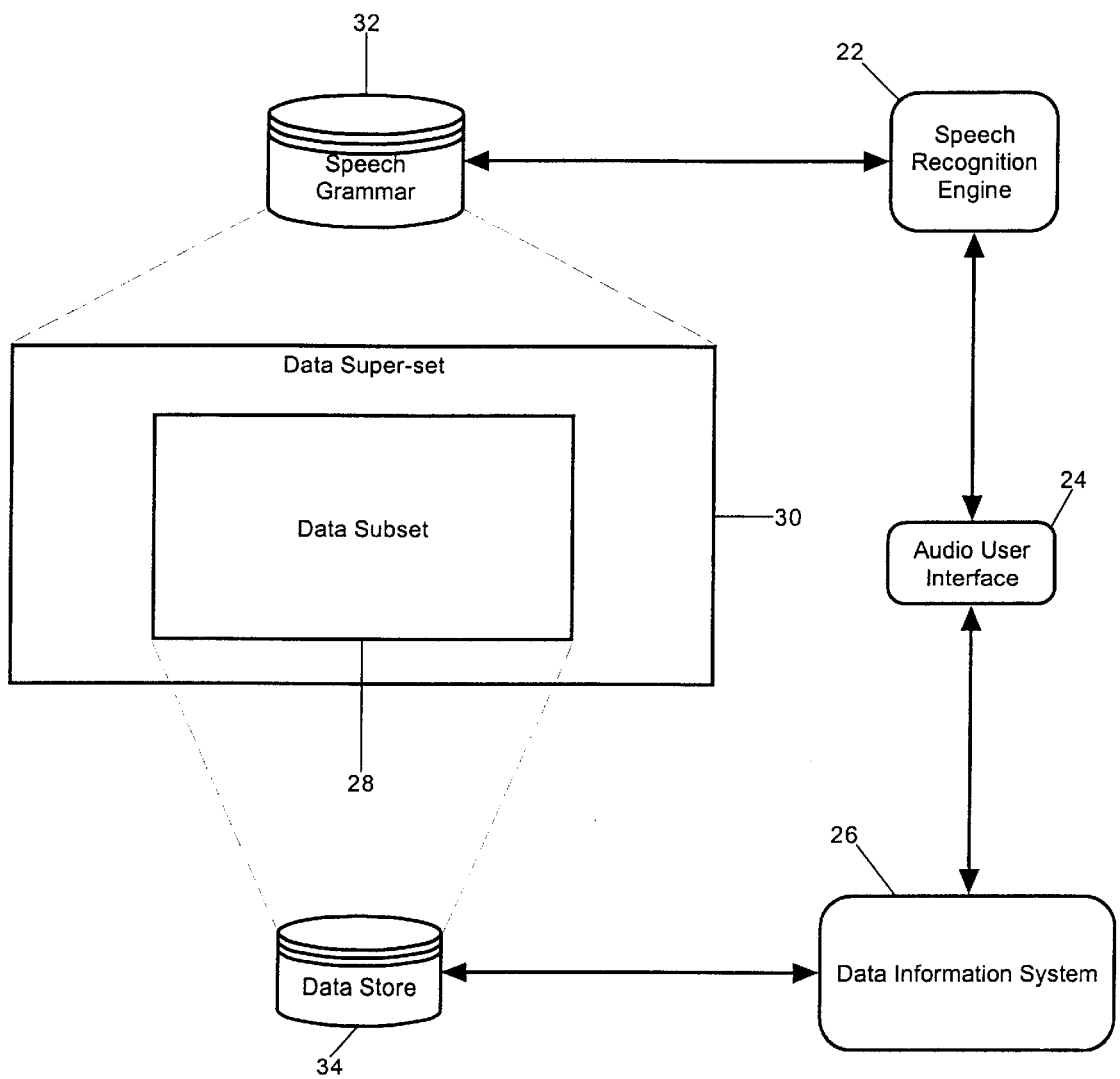
FIG. 3 is a block diagram illustrating a method and system for voice data entry availability in the voice response system of FIG. 1.

FIG. 3 is a block diagram illustrating a method and system for voice data entry recognition in the voice response system. In the preferred embodiment, the speech recognition engine 22 includes a speech grammar 32. More particularly, the speech recognition engine 22 includes a vocabulary which comprises a list of available words and/or phrases that the speech recognition engine 22 can use with which the speech recognition engine 22 can match speech input and translate it into text. Together, with word-usage models, the vocabulary can be used by the speech recognition engine 22 in the selection of the best match for a spoken word or phrase. Although there exist command, grammar and dictation vocabularies, the present invention relates to the use of a grammar-based (speech grammar) and spoken-language natural language understanding ("NLU") technologies.

The speech recognition engine 22 uses a speech grammar 32 to recognize words or phrases contained in a compiled grammar which can be created when developing a voice enabled data information system. For grammar-based vocabularies, the speech grammar 32 defines the word-usage model, since it formally defines the set of allowable words and the sequences of words that can be recognized by the speech recognition engine 22. Significantly, the user typically can be constrained to speech contained within the speech grammar 32.

FIG. 3 further illustrates the data store 34 used by the data information system 26. The data store 34 is a database which can store information relating to the business logic of the data information system. For example, the data store 34 can store records containing contact information, pharmaceutical definitions, sports team statistics, etc. The range of data which can be included in the data store 34 is shown as data subset 28. Notably, data subset 28 is merely a subset of data relating to the data information system 26. For example, in the above-described case of a destination information system, while a super-set of data 30 related to the destination information system can include all cities in the United States, including Sunny Ga. the data subset 28 can include only cities in Florida known to have airline service. Hence, the exemplary destination information system can only retrieve records from the data store 34 relating to cities in Florida. No record exists in the data store 34 which corresponds to Sunny Ga.

The data information system 26 is shown to be voice enabled. That is, the data information system can respond to data input received directly through the audio user interface 24. The voice enablement of the data information system 26 is achieved through the audio user interface 24, which can conventionally receive audio input and provide the audio input to the speech recognition engine 22 for speech-to-text conversion using speech recognition techniques well-known in the art. Subsequently, the audio user interface 24 can conventionally receive the speech-to-text converted audio input and, in turn, can provide the speech-to-text converted audio input to the data information system 26 as data input. Hence, a user can operate the data information system 26 by voice through the use of the audio user interface 24. For example, if a user wants to query the data information system 26, the user need only provide a voice query to the speech recognition engine 22 which, in turn, can convert the voice query to a textual query which ultimately can be provided to the data information system 26. The data information system 26 can perform the textual query of the data store 34 and can provide any result set to the user. Notably, although not shown in FIGS. 2 and 3, the result preferably is returned to a speech synthesis engine which can audibly present the result set to the user.

The speech grammar 32 upon which the speech-to-text conversion performed by the speech recognition engine 22 is based can include the data super-set 30 which includes not only all words in the data subset 28, but also those words not available in the data information system 26 which relate nonetheless to the subject matter of the data information system 26. For example, in the aforementioned example of the destination information system, the data super-set 30 can include all cities in the United States, including Sunny Ga. In consequence, although the data store 34 contains only those cities in Florida, a user's voice query of Sunny Ga. will not cause the speech recognition engine 22 to throw an OOG exception. Rather, because the speech grammar 32 contains all cities in the United States, the speech recognition engine 22 can correctly perform speech-to-text conversion of the voice query for Sunny Ga. Moreover, the destination information system can perform a query based on the voice query, Sunny and can correctly report to the user that "There is no information on Sunny Ga." Thus, a voice data entry availability system in accordance with the inventive arrangement includes a speech grammar 32 having therein the data super-set 30, of which only a data subset 28 is included in a data store 34 in the data information system 26.

A method for voice data entry availability in a voice response system can be realized in hardware, software, or a combination of hardware and software. Machine readable storage according to the present invention can be realized in a centralized fashion in one computer system, or in a distributed fashion where different elements are spread across several interconnected computer systems. Any kind of computer system or other apparatus adapted for, carrying out the methods described herein is acceptable. A typical combination of hardware and software could be a general purpose computer system with a computer program that, when being loaded and executed, controls the computer system such that it carries out the methods described herein. The present invention can also be embedded in a computer program product which comprises all the features enabling the implementation of the methods described herein, and which when loaded in a computer system is able to carry out these methods. A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form.

What is claimed is:

1. A method for voice data entry availability in a voice response system comprising the steps of:

establishing a data set of words;

including said data set of words in a speech recognition grammar for use with a speech recognition engine;

including a subset of said data set in a data store, said subset having words used by a data information system, said subset not having words from said data set which are not used by said data information system, wherein said subset is derived from said speech recognition grammar;

receiving speech queries specifying data through an audio user interface to said data information system;

performing speech-to-text conversion of said speech queries using said speech recognition engine;

if said specified data is in said speech recognition grammar, processing said speech queries with said specified data when said specified data is in said subset, and indicating that said specified data was recognized but was not in said subset when said specified data is not in said subset such that said data information system is unable to process said specified data; and, if said specified data is not in said speech recognition grammar, reporting that said specified data cannot be speech-to-text converted and not processing said speech query.

2. The method according to claim 1, wherein said step of reporting that said specified data cannot be speech-to-text converted comprises the step of:

throwing an Out-Of-Grammar (OOG) exception.

3. The method according to claim 1, wherein said step of receiving speech queries through an audio user interface to said data information system comprises the step of:

receiving speech queries in said voice response system telephonically, said speech queries originating through a telephone handset;

said speech queries transmitted through a telephone data network;

said speech queries received in said voice response system through a telephone data network interface in said voice response system;

said speech queries communicated from said telephone data network interface to said audio user interface.

4. The method according to claim 1, wherein said audio user interface is a Voice Browser to a Web-enabled data information system, said Voice Browser enabling voice operation of said Web-enabled data information system.

5. A method for voice data entry availability in a voice response system comprising the steps of:

receiving speech input in an audio user interface to a data information system for processing data in a data store, said speech input specifying data through an audio user interface to said data information system;

performing speech-to-text conversion of said speech input using a speech recognition engine with reference to a corresponding speech recognition grammar;

if said specified data is included in said speech recognition grammar, processing said speech data in said speech query if said specified data is in said data store, and indicating that said specified data was recognized but was not processed such that said data information system is unable to process said specified data if said specified data is not in said data store; and, if said specified data is not included in said speech grammar, reporting an Out-Of-Grammar (OOG) condition and not processing said speech data in said speech query, said speech recognition grammar containing a data set of words relating to said data information system; and, said data store containing a subset of said data set, said subset having words which can be processed by said data information system, said subset not having words which cannot be processed by said data information system, wherein said subset is derived from said speech recognition grammar.

6. The method according to claim 5, wherein said step of reporting an OOG condition comprises the step of:

throwing an OOG exception.

7. The method according to claim 5, wherein said step of receiving speech input in an audio user interface to said data information system comprises the step of:

receiving speech input in said voice response system telephonically, said speech input originating through a telephone handset;

said speech input transmitted through a telephone data network;

said speech input received in said voice response system through a telephone data network interface in said voice response system;

said speech input communicated from said telephone data network interface to said audio user interface.

8. The method according to claim 5, wherein said audio user interface is a Voice Browser to a Web-enabled data information system, said Voice Browser enabling voice operation of said Web-enabled data information system.

9. A machine readable storage, having stored thereon a computer program having a plurality of code sections executable by a machine, said code sections for causing the machine to perform voice data entry availability in a voice response system, said code sections performing the steps of:

receiving speech input in an audio user interface to a data information system for processing data in a data store, said speech input specifying data through an audio user interface to said data information system;

performing speech-to-text conversion of said speech input using a speech recognition engine with reference to a corresponding speech recognition grammar;

if said specified data is included in said speech recognition grammar, processing said speech data in said speech query if said specified data is in said data store, and indicating that said specified data was recognized but was not processed such that said data information system is unable to process said specified data if said specified data is not in said data store; and, if said specified data is not included in said speech grammar, reporting an Out-Of-Grammar (OOG) condition and not processing said speech data in said speech query, said speech recognition grammar containing a data set of words relating to said data information system; and, said data store containing a subset of said data set, said subset having words which can be processed by said data information system, said subset not having words which cannot be processed by said data information system, wherein said subset is derived from said speech recognition grammar.

10. The machine readable storage according to claim 9, wherein said step of reporting an OOG condition comprises the step of:

throwing an OOG exception.

11. The machine readable storage according to claim 9, wherein said step of receiving speech input in an audio user interface to said data information system comprises the step of:

receiving speech input in said voice response system telephonically, said speech input originating through a telephone handset;

said speech input transmitted through a telephone data network;

said speech input received in said voice response system through a telephone data network interface in said voice response system;

said speech input communicated from said telephone data network interface to said audio user interface.

12. The machine readable storage according to claim 9, wherein said audio user interface is a Voice Browser to a Web-enabled data information system, said Voice Browser enabling voice operation of said Web-enabled data information system.

* * * * *